(12) United States Patent
Plotkin et al.

(10) Patent No.: US 7,978,214 B2
(45) Date of Patent: Jul. 12, 2011

(54) APPARATUS AND METHOD OF REDUCING BANDING ARTIFACT VISIBILITY IN A SCANNING APPARATUS

(75) Inventors: Michael Plotkin, Rehovot (IL); Dror Kella, Nes-Ziona (IL); David Towner, Boise, ID (US); Mani Fischer, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 174 days.

(21) Appl. No.: 12/297,522

(22) PCT Filed: Apr. 19, 2006

(86) PCT No.: PCT/US2006/014599
§ 371 (c)(1),
(2), (4) Date: Oct. 17, 2008

(87) PCT Pub. No.: WO2007/120146
PCT Pub. Date: Oct. 25, 2007

(65) Prior Publication Data
US 2009/0128616 A1 May 21, 2009

(51) Int. Cl.
*B41J 2/47* (2006.01)
*G06K 9/40* (2006.01)

(52) U.S. Cl. ..................... 347/254; 382/275

(58) Field of Classification Search .............. 347/240, 347/251–254, 229, 234, 248; 382/275
See application file for complete search history.

(56) References Cited

U.S. PATENT DOCUMENTS

| | | | |
|---|---|---|---|
| 4,989,019 A | 1/1991 | Loce | |
| 5,225,851 A * | 7/1993 | Schoon | 347/240 |
| 5,278,578 A | 1/1994 | Baek | |
| 5,808,655 A | 9/1998 | Haas | |
| 6,025,922 A | 2/2000 | Marsden | |
| 6,710,795 B2 * | 3/2004 | Sanger | 347/240 |
| 2002/0159791 A1 | 10/2002 | Chen | |
| 2003/0112321 A1 | 6/2003 | Pierson | |

FOREIGN PATENT DOCUMENTS

EP 0740454 A 10/1996

OTHER PUBLICATIONS

Chen et al; Incorporating human visual model and spatial sampling in banding artifact reduction 9; 2004 Proceedings—American Control Conference; Boston, MA; U.S.A; Jun. 30, 2004.
International Search Report for PCT Patent Application No. PCT/US2006/014599; Dec. 18, 2006.

* cited by examiner

*Primary Examiner* — Hai C Pham

(57) ABSTRACT

A method of, and apparatus for, reducing the visibility of banding artifacts on a printed medium comprising producing synthetic artifacts on the printed medium, overlapping scan lines at swath boundaries and controlling exposure along a scan line to reduce the visibility of the banding artifacts.

12 Claims, 9 Drawing Sheets

APPARATUS AND METHOD OF REDUCING BANDING ARTIFACT VISIBILITY IN A SCANNING APPARATUS

BACKGROUND OF THE INVENTION

Laser printers, digital printing presses, copiers, fax machines, plate setters, direct-to-film laser printers, scanned laser displays, other printing and display devices and some systems used for the fabrication of electrical circuits, use a plurality of light sources to emit light that is scanned across a medium. The light produces a number of exposed scan lines on the medium where the medium has been altered by the light to form a latent image. The scan lines and scan line spacing can suffer from a number of errors which may be caused by the optical system used to produce the scan lines on the photosensitive medium, for example due to an aberration such as distortion in the optical system.

Dry toner laser printers, and liquid electrophotographic (LEP) laser printers (to name only some printers) generally use a discharge area development (DAD) electrophotographic process in which light is used to selectively discharge electrical charge on a photoconductor to form a latent electrostatic image. Electrically charged toner or ink is then applied to the photoconductor and adheres to the photoconductor in exposed regions in which the electrical charge has been discharged but does not adhere in unexposed image regions which have not been discharged. The adhered toner or ink is then transferred to a print medium such as paper and fused onto the print medium. Errors in the scan lines produced on the photoconductor can produce visible artifacts in the printed image on the print medium, which are undesirable. Some electrophotographic devices use charge area development (CAD), for example, many photocopiers use CAD.

For electrophotographic printers, a certain exposure energy density, for example measured in $\mu J/cm^2$, is necessary to adequately discharge the electrical charge on the photoconductor. The exposure energy density for a particular region of photoconductor can be regarded as the product of the power density (normally measured in $mW/cm^2$) of the light incident on the photoconductor and the exposure time of the photoconductor by the light for that region of the photoconductor.

Some systems used for the fabrication of electrical circuits scan light onto a substrate to produce a scan line on the substrate by means of a photochemical reaction. A minimum exposure energy density may be required for the light incident on the substrate in order that a circuit can be properly manufactured. Artifacts resulting from scan line errors may be detrimental to the performance of the electrical circuit that is produced.

SUMMARY OF THE INVENTION

Aspects and embodiments of the invention are set out in the appended claims.

According to an aspect of the invention there is provided a method of reducing the visibility of primary banding artifacts on a printed document produced by a printer, the method comprising causing the printer to print synthetic secondary banding artifacts so that the combined spatial frequency of primary banding artifacts and synthetic secondary banding artifacts on the printed document is greater than the spatial frequency of the primary banding artifacts on the printed document.

According to a further aspect of the invention there is provided a printer comprising an array of light sources, a scanning device arranged to scan light emitted from the light sources onto a photosensitive surface to generate a plurality of scan lines on the medium, and a controller to control the optical power of light produced by the light sources, wherein the controller is configured to control the light sources so as to generate intentional banding artifacts on the photosensitive surface.

According to a further aspect of the invention there is provided a printer comprising an array of light sources and a scanning device arranged to scan light emitted from the light sources onto a photosensitive surface to generate a plurality of scan lines on the photosensitive surface, wherein the separation between respective light sources in the array for producing respective scan lines is different from the separation between other light sources to produce other respective scan lines in the swath so as to produce an intentional banding artifact.

According to a further aspect of the invention there is provided a method of reducing the visibility of artifacts caused by differential scan bow in a scanning instrument, the scanning instrument arranged to produce a plurality of adjacent swaths of scan lines, wherein the method comprises controlling the scanning instrument to produce a swath of scan lines such that an outer scan line of the swath overlaps with an outer line of an adjacent swath of scan lines.

It will be appreciated that various features of some embodiments and aspects of the invention can be combined with other features of other embodiments and aspects of the invention. Similarly, embodiments and aspects of the invention that are expressed in terms of apparatus features can also be expressed in terms of method features and vice versa. All combinations, in any number, of features are envisaged and disclosed. Similarly, embodiments and aspects of the invention that are expressed as method steps can also be expressed as software, which when operated on a processor, are configured to perform those method steps.

BRIEF DESCRIPTION OF THE DRAWINGS

Embodiments of the invention will now be described, by way of example only, with reference to the accompanying drawings, of which.

DETAILED DESCRIPTION OF THE PREFERRED EMBODIMENT

Figure 1:
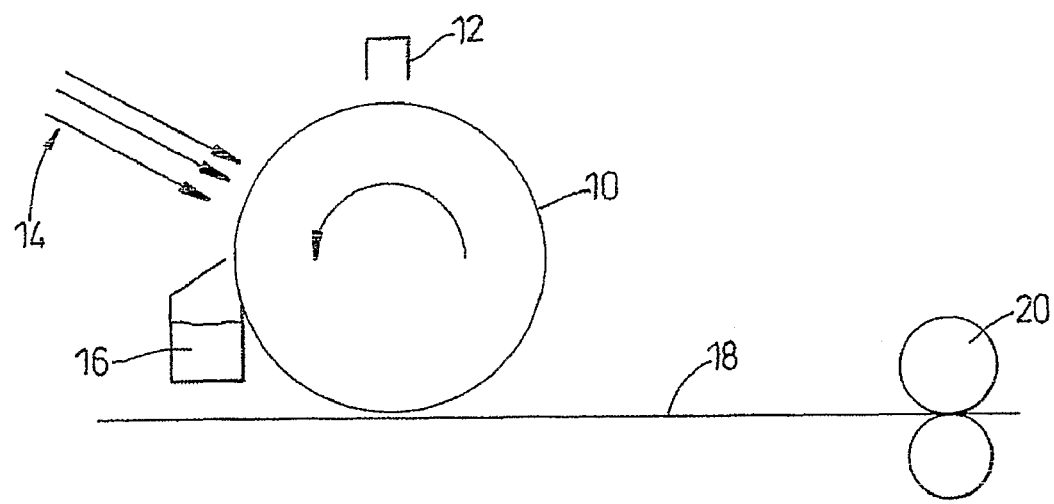
FIG. 1 schematically illustrates a printer according to an embodiment of the invention.

Referring to FIG. 1, a printer comprises a photoconductor 10 that generally forms the outer surface of a rotatable cylindrical drum. During the printing process the surface of the photoconductor 10 is uniformly charged with static electricity by, for example, a corona discharge 12. Portions of the photoconductor 10 are exposed with light 14 from an array of light sources 40 (illustrated in FIGS. 2 and 3). The drum is rotated so that the image to be printed is formed on the photoconductor 10. The light 14 discharges the charge on the drum in exposed areas and leaves a charged latent image. The latent image is then developed by applying a toner 16, such as a liquid ink toner (e.g. as in LEP printing) or a pigmented dry powder toner, over the surface of the photoconductor 10. The toner 16 adheres to the discharged areas of the photoconductor 10 so that the latent image becomes visible. The toner 16 is then transferred from the photoconductor 10 to a sheet of paper 18 or to some other medium which is to support the printed image. A fuser 20 may be used to fix the image to the paper 18 by applying heat and pressure, or pressure alone, to the toner 16 on the paper 18. The direct-to-paper transfer system shown in FIG. 1 represents only a subset of electro-photographic printers. Many electrophotographic printers use an intermediate transfer drum or belt to receive the toner image from the photoconductor and apply it to the print medium. Some printers have no separate fuser, and the fusing process occurs during the transfer from the intermediate transfer drum to the paper.

Figure 2:
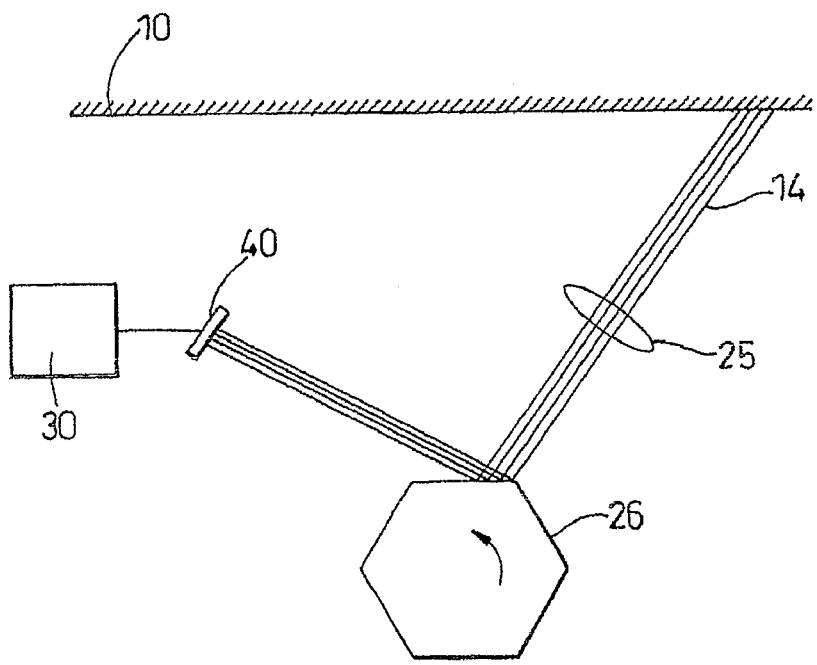
FIG. 2 schematically illustrates an optical system, according to an embodiment of the invention, for use with the printer of FIG. 1.
Figure 3:
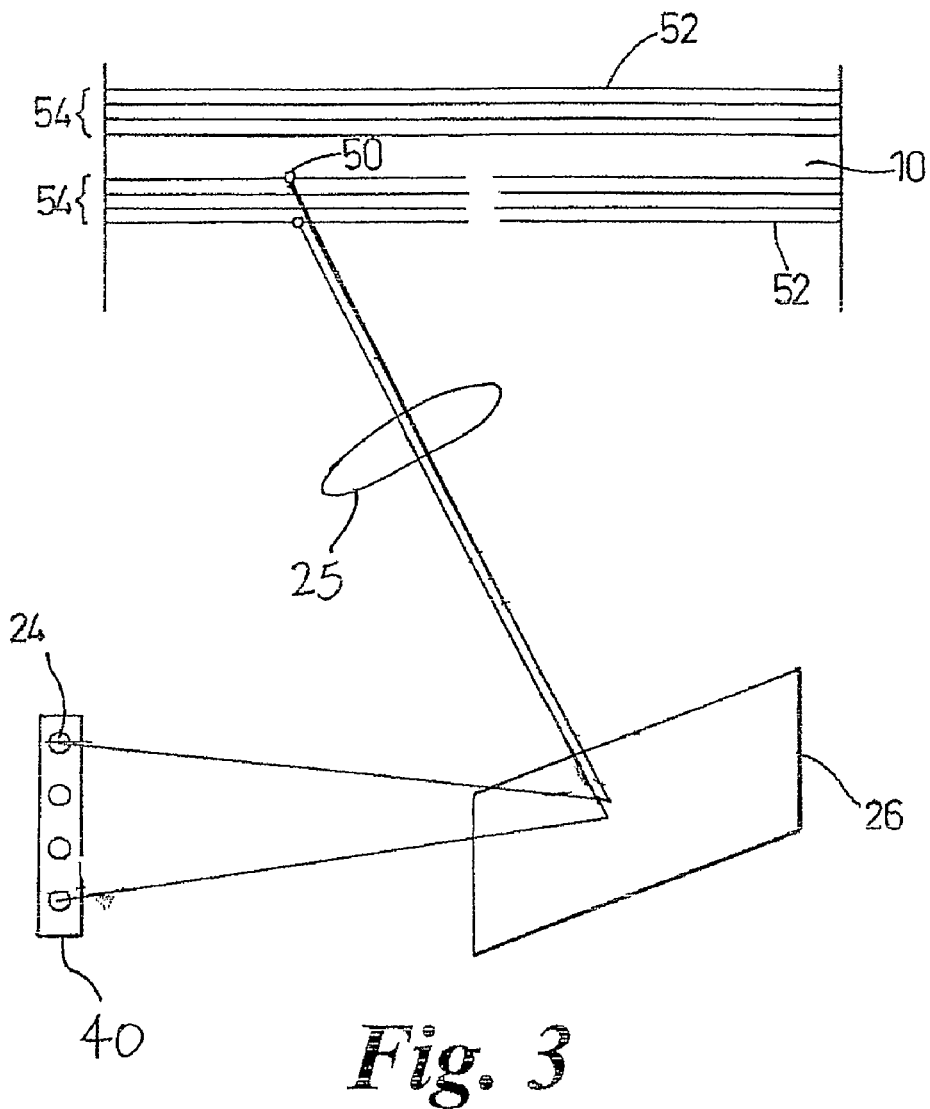
FIG. 3 is a schematic perspective view of the optical system of FIG. 2.

Referring to FIGS. 2 and 3, an optical system that can be used as part of the printer comprises an array of light sources 40, optical components 25 that receive light from the array of light sources and form an array of light spots 50 on a photosensitive surface 10, and a scanning device that deflects the array of light spots 50 across the photosensitive surface 10. FIG. 2 shows a plan view of the optical system whereas FIG. 3 shows a perspective view of the optical system. The scanning device may take the form of, for example, a polygon mirror 26. FIG. 2 illustrates the scanning device as a six-sided mirror 26, although a mirror with more or less sides could be used or a refractive or diffractive optical element could be used. Rotation of the mirror 26 causes light from the array of light sources 40 to be deflected by one of the mirror's faces and thereby cause the array of light spots 50 to scan from one side of the photosensitive surface 10 to the other to produce a swath of scan lines 54. That is, for a cylindrical photosensitive surface, the light is scanned in a direction parallel to the longitudinal axis of the cylinder. As the mirror 26 is further rotated, the laser light will become incident on a different mirror facet and a new scan across the photosensitive surface 10 is started. In this way a latent image is built up on the photosensitive surface 10 as a series of swaths, each swath comprising one or more scan lines on the photosensitive surface 10.

In the example illustrated in FIG. 3, a swath of four scan lines 52 is produced by simultaneously scanning the light output from four light sources 24 in the array of light sources 40. For clarity, rays of light are only illustrated for two of the four light sources 24 and only the active face of the polygon mirror 26 is shown. It should be understood that FIG. 3 is purely schematic and the geometry of the light rays is not intended to be accurate. An image is produced on the photoconductor 10 as a series of swaths 54. A swath 54 comprises a group of scan lines 52 that is produced simultaneously when light from the array 40 is scanned across the photoconductor 10. In the optical system illustrated in FIGS. 2 and 3, the rotation of polygon mirror 26 causes each successive facet of the polygon to produce a successive swath 54. In the example illustrated a swath 54 comprises a group of four scan lines 52. Generally, the number of scan lines 52 in a swath 54 will be determined by the process speed and addressability of the printer, and may be more or less than four. The gap between adjacent swaths 54 has been exaggerated in FIG. 3 for illustrative purposes, however, in general, the gap between adjacent swaths 54 will be the same, or about the same, as the gap between adjacent scan lines 52 within a swath 54.

The optical system may comprise other optical components 25 such as, among others, a lens to collimate the light from the array of light sources 40, mirrors to direct the light so that it follows a desired route through the printer and a scan lens to focus light reflected from the polygon mirror 26 onto the photoconductor 10. These optical components may be located between the polygon mirror 26 and the photoconductor 10 as indicated in FIG. 3. Some of these components are located between the light sources 40 and the polygon mirror (although this is not shown in FIG. 3). For example, in some embodiments a laser collimator lens and a cylinder lens are located between the light sources 40 and the polygon mirror.

It should be noted that other arrangements could be used to scan light across the photoconductor 10. In some arrangements the light can be scanned across the photoconductor 10 by having the beams from the array of light sources 40 in a fixed position and moving the photoconductor 10 in order to produce the scan lines on the photoconductor 10. In other arrangements both the photoconductor 10 and the array of light sources 40 and/or other optical elements may be moved in order to create the scan lines on the photoconductor 10.

The beams of light 14 from the array of light sources 40 are modulated by a controller 30 so that the appropriate portions of the photoconductor 10 are illuminated in order to obtain the desired latent image on the photoconductor 10. The controller 30 may function by sending electrical signals to the array of light sources 40 to control the optical power produced by each of the light sources 24 in the array 40.

Figure 4:
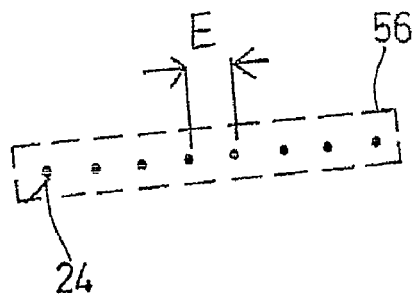
FIG. 4 schematically illustrates an array of light sources that can be used in an embodiment of the invention.

FIG. 4, is a schematic illustration of an example of an array 40 of light sources. In the example illustrated in FIG. 4, the array 40 comprises a row of eight light sources 24 and each of the light sources, can be used to generate a respective, different, scan line 52. The light sources 24 need not be arranged in a row in this way and other geometries are possible.

The light sources 24 may comprise lasers but other lights sources that can produce the required exposure energy density could also be used. In embodiments of the invention the light sources 24 comprise vertical cavity surface emitting lasers (VCSELs). An array of VCSELs can be manufactured on a single wafer with a small spacing between the lasers. For example, the spacing between the lasers may be of the order of 30 μm in both coordinate directions of the array. An array of VCSELs can be manufactured with an arbitrary spacing between the lasers above the minimum spacing that is practical. The minimum spacing is currently about 30 μm however this may become smaller as manufacturing techniques improve. An array of VCSELs can typically be produced for significantly less cost than an array of edge-emitting lasers.

Figure 5:
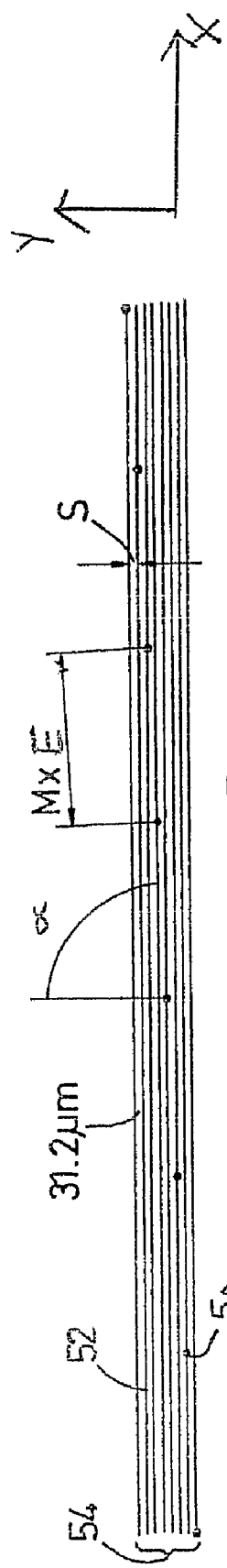
FIG. 5 schematically illustrates a prior art one-dimensional array of eight light spots for exposing eight scan lines.

The array of light sources 40 is capable of producing multiple beams of light 14 that form an array of light spots 50 that are scanned across the photoconductor 10. Referring to FIG. 5, the beams 14 form an array of light spots 50 on the photoconductor 10 which is an image of the array of light sources 40. The light spots 50 simultaneously expose multiple scan lines 52 on the photoconductor 10. FIG. 5 shows an arrangement of eight focussed light spots 50 on a photoconductor 10 and a portion of a swath 54 of eight scan lines 52 produced by those spots 50. The array of light sources 40 may be larger or smaller so that there are more or less scan lines 52 per swath 54, for example, an array of light sources 40 may be used to generate twelve, eighteen or twenty-four scan lines 52 per swath 54. Each scan line 52 of a swath 54 is capable of being encoded with its own separate data content. The light spots 50 are illustrated as circular spots, however it may be preferable for the light spots 50 to be elliptical or otherwise non-circular to achieve the desired pixel shape in the exposed image. The shape of the focused spots can be controlled by the shape of an aperture stop in the optical system, the numerical apertures of the beams in the scan and cross-scan directions, and by other optical means well known in the art. The shape of light spots 50 is also affected by diffraction and aberrations produced by the optical system.

The exposure delivered to a scan line 52 by a light source 24 can be controlled by varying the amount of optical power produced by the light source 24 in a power modulation system or by varying the time-width of pulses of light produced by the light source in a pulse-width-modulated exposure system, or by a combination of power modulation and pulse-width modulation, or in some other way. The control can be achieved by controlling the amount of light produced by a light emitter (such as a laser) or by controlling another optical element such as, for example an optical switch or light modulator, that may form part of the light source 24.

Two directions may be defined in relation to the array of light spots 50: one direction is the scan, or format, direction X which is the direction in which a spot 50 is scanned in order to produce a scan line 52; the other direction is the process direction Y (also referred to as the "cross-scan direction" or "transverse to the scan direction") which is substantially orthogonal to the format direction. The process direction is the direction in which the surface of the photoconductor 10 or other photosensitive medium is moved relative to the light spots 50 in order to generate an image from the scan lines 52. For the printer illustrated in FIG. 1, the process direction is defined by the direction of rotation of the photoconductor drum 10.

The addressability of a printer is usually measured in pixels per inch or its commonly used equivalent "dots per inch" or DPI on the printed image. The process-direction addressability of a printer measured in DPI is equivalent to the number of scan lines per inch because each scan line exposes one row of printer pixels and the distance between adjacent scan lines is equal to the Y-direction distance between adjacent printer pixels. Higher addressability enables the reproduction of smoother edges and finer details, as well as an increased number of density levels for a given number of bits-per-pixel of exposure data modulation.

Generally, the beams of light 14 are focused with a scan lens to produce a magnified image of the array 40 on the photoconductor 10. If the spacing between the light sources 24 in a row 56 of light sources 22 is E then the corresponding spacing of the light spots 50 on the photoconductor 10 will be M×E, where M is the magnification of the optical system. More generally, the magnification M of the optical system will ordinarily be different in the scan direction X and cross-scan direction Y and it will be necessary to use a scan direction magnification $M_x$ and a cross-scan magnification $M_y$ when determining spot separation distances on the photo conductor.

Figure 6:
FIG. 6 schematically illustrates common mode scan bow.
Figure 7:
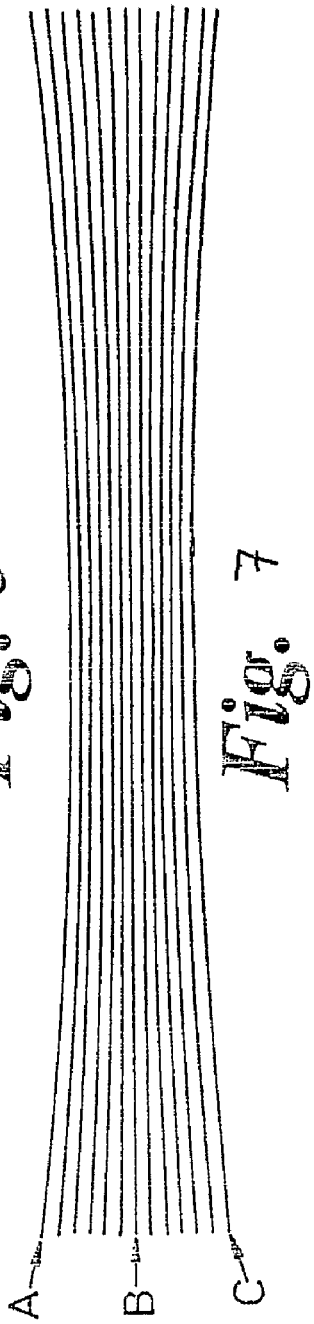
FIG. 7 schematically illustrates differential scan bow due to positive distortion, the visible effect of which may be corrected according to an embodiment of the invention.
Figures 8, 9:
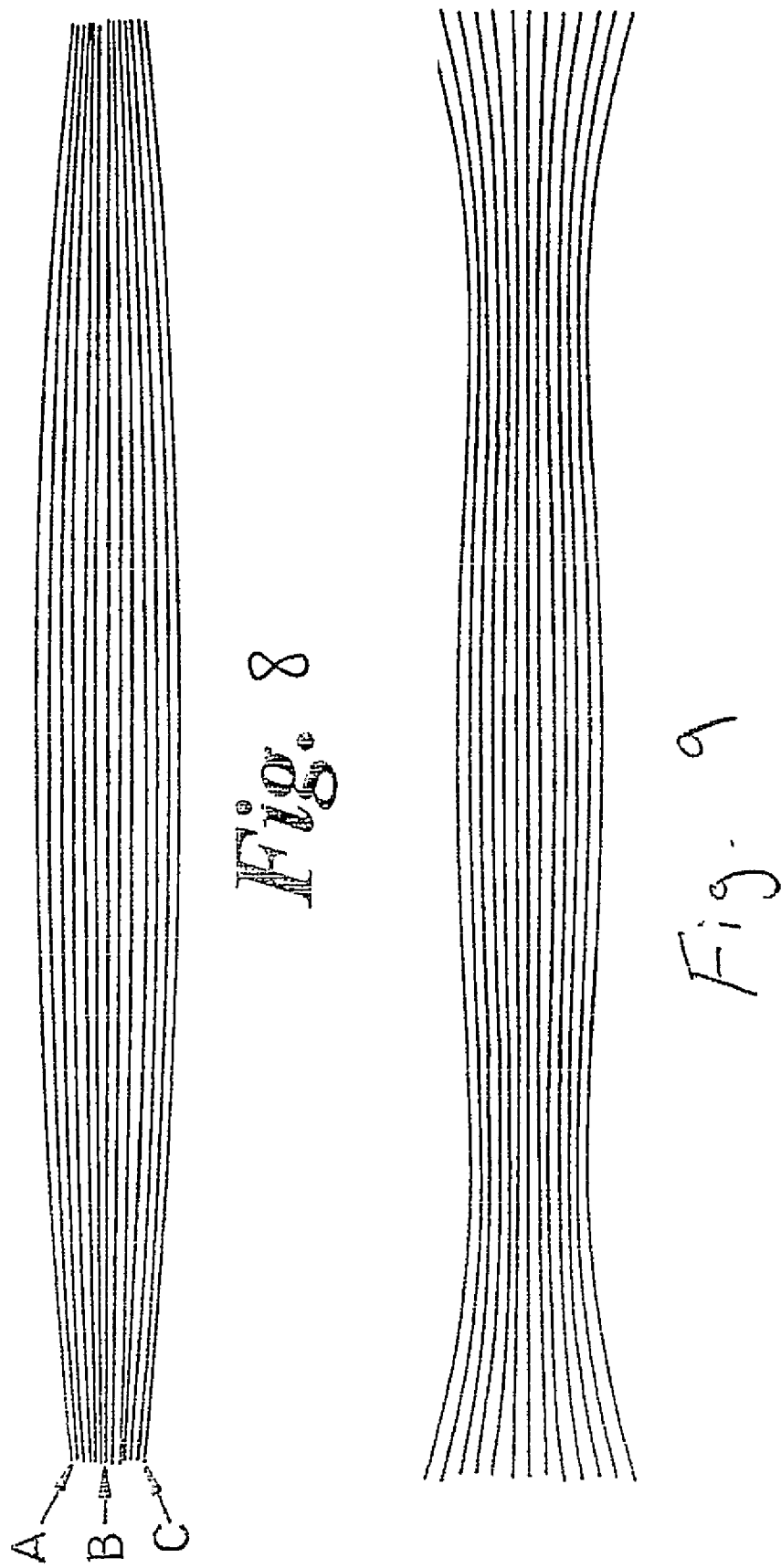
FIG. 8 schematically illustrates differential scan bow due to negative distortion, the visible effect of which may be corrected according to an embodiment of the invention.
FIG. 9 schematically illustrates differential scan bow due to partially corrected distortion, the visible effect of which may be corrected according to an embodiment of the invention.

Distortion or other optical non-idealities in the scanning system can cause curvature in the scan lines 52. The curvature is termed "scan bow" and may cause visible artifacts in the printed image. Scan bow takes various forms, for example, as illustrated in FIG. 6, the curvature may affect all scan lines 52 within a swath 54 substantially equally and is referred to as "common mode scan bow". In another form, the curvature varies within the print swath 54, as illustrated in FIGS. 7, 8 and 9, and is termed "differential scan bow". Differential scan bow is an inherent optical characteristic of many laser scanner designs. It is a consequence of the method used to correct polygon wobble in nearly all laser printers, wherein the focal length of the scan lens must be shorter in the cross-scan direction than in the scan direction. The scan lens is thus "anamorphic" and typically has a distortion aberration which causes the separation between scan lines to change as a function of distance from the center of the format in the scan direction. As illustrated in FIGS. 7 and 8, scan lines B, which pass through the center of the image field of the scan lens, are straight while scan lines A and C, which do not pass through the center of the image field, are curved. Differential scan bow increases as the cross-scan width W of the scanned swath increases. In the past, differential scan bow has limited the width of the swath of scan lines that can be printed, therefore the number of scan lines that can be written in each swath at a given addressability (DPI). This limitation has been a barrier to increasing the printing speed of laser printers.

As previously described, scan bow is a scan line curvature caused by distortion or other optical nonidealities in a scanning system. As illustrated in FIG. 6, curvature due to common mode scan bow affects all scan lines within a swath similarly, while curvature due to differential scan bow varies within the print swath shown in FIGS. 7, 8 and 9.

Note that differential scan bow can result from positive ("pincushion") distortion, as illustrated in FIG. 7, which causes the separation between scan lines in a swath to increase as a function of distance from the center of the format, or it can result from negative ("barrel") distortion, as shown in FIG. 8, which causes the separation between scan lines to decrease as the distance from the center of the format increases. The vertical scale of both of these figures has been exaggerated to better show the nature of the error. More generally, differential scan bow can be the residual uncorrected error that results from partially correcting distortion in the design of the optical system. Third order distortion of one sign might, for example, be compensated by fifth order distortion of the other sign, resulting in differential scan bow with a more complex functional dependence on format position, as illustrated in FIG. 9.

Figure 14:
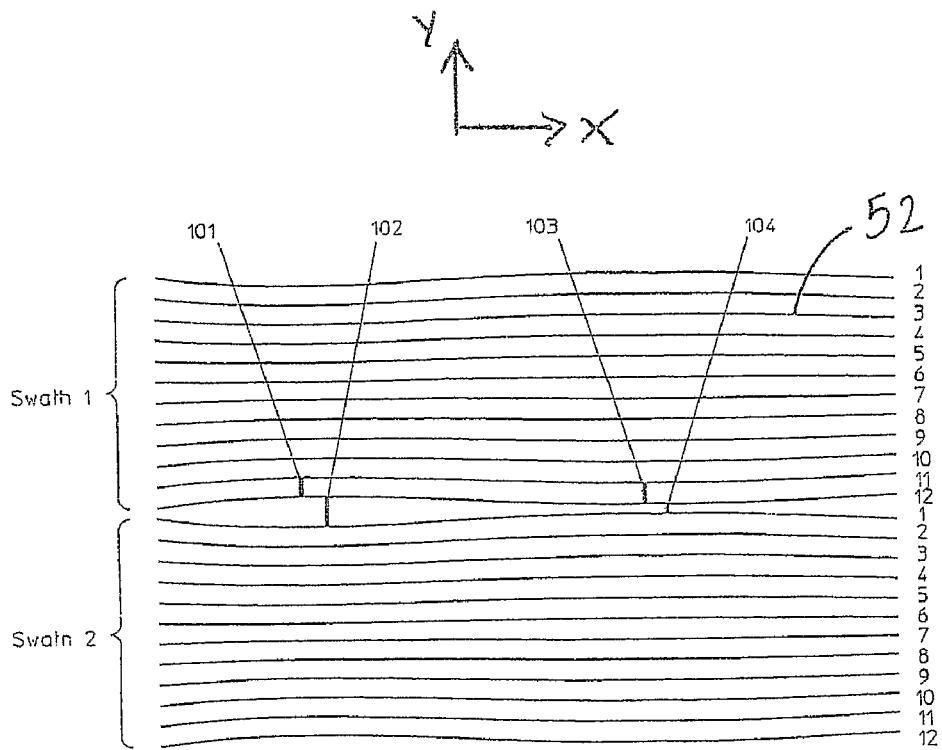
FIG. 14 schematically illustrates two neighboring swaths of scan lines having an artifact caused by differential scan bow which may be corrected according to an embodiment of the invention.

Differential scan bow causes a discontinuity in scan line curvature and scan line separation at the boundary between adjacent print swaths 54. As shown in FIG. 14, the separation between scan lines at swath boundaries varies as a function of format position, causing a print artifact that varies in visual density in the scan direction X and repeats at the swath pitch in the cross-scan direction Y. These artifacts appear as bands on the printed product and therefore may be referred to as a type of "banding artifact".

Another type of banding artifact is caused by errors in the process direction separation of scan lines in a swath of scan lines, resulting in an abnormally wide or narrow space between the last scan line of a first swath and the first scan line of a second swath. During the construction of a laser printer, it is often difficult to adjust the scan line separation in a multi-beam laser printer accurately enough such that no visible artifacts result from the residual scan line placement errors. Such spacing errors are typically caused by a rotational misalignment of the laser array about the output beam propagation direction or by a speed mismatch between the polygon scanner and the photoconductor surface.

Figure 10:
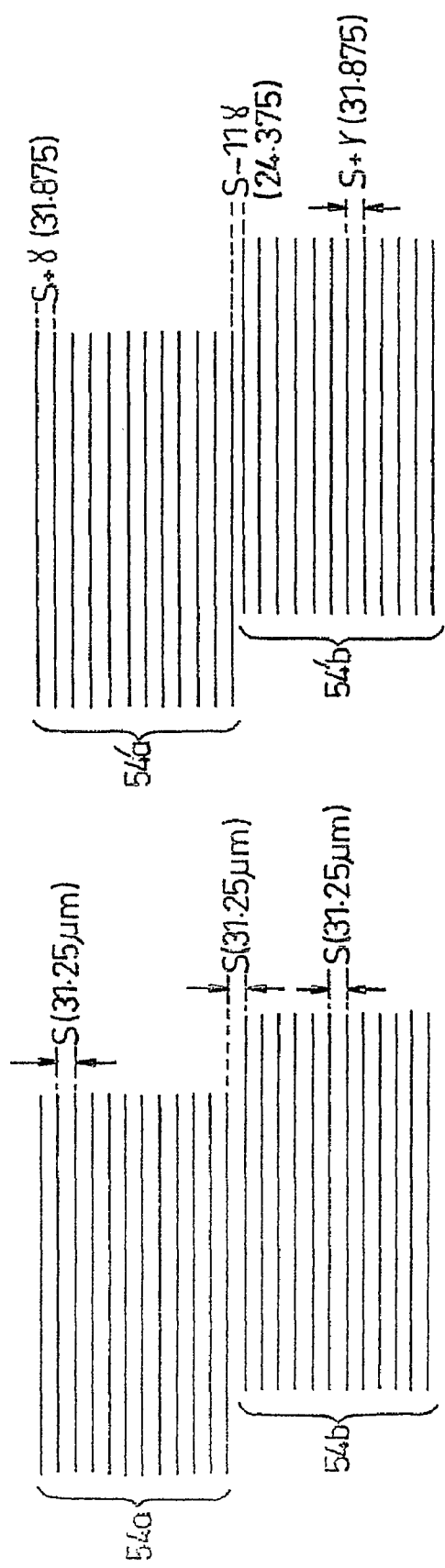
FIG. 10 schematically illustrates an error in the spacing of scan lines between neighboring swaths of scan lines, the visible effect of which may be corrected according to an embodiment of the invention.

Referring to FIG. 10, two adjacent swaths, as may be produced by a 12-beam printer, are illustrated. The two swaths, labeled 54a and 54b, are shown offset from each other in the format direction, this is for illustration purposes only so that the two swaths 54a, 54b may be distinguished from each other and such an offset is not actually present. The intended scan line spacing S within a swath 54 may be, for example, 31.25 µm and the intended spacing between the twelfth scan line of the first swath 54a and the first scan line of the second swath 54b should also be 31.25 µm so that all the scan lines used to generate a printed image will have the same spacing.

The effect of, for example, a 2% error in scan line spacing will cause the scan lines within a print swath to now be 31.875 µm apart and the separation between the first and the twelfth scan lines in the swath is 350.625 µm rather than the intended 343.750 µm. As a result, the eleventh and twelfth scan lines of a first swath are 31.875 µm apart, but the separation between the twelfth scan line of a first swath and the first scan line of a second swath is only 24.375 µm. This 7.5 µm reduction in the separation of adjacent scan lines at the boundary between swaths equates to a periodic 23.5% error in scan line spacing. Such an error would result in a clearly visible print artifact.

The scan line spacing errors that regularly occur between the last scan line of a first swath and the first scan line of a second swath can cause visible banding artifacts in printed output.

Figure 11:
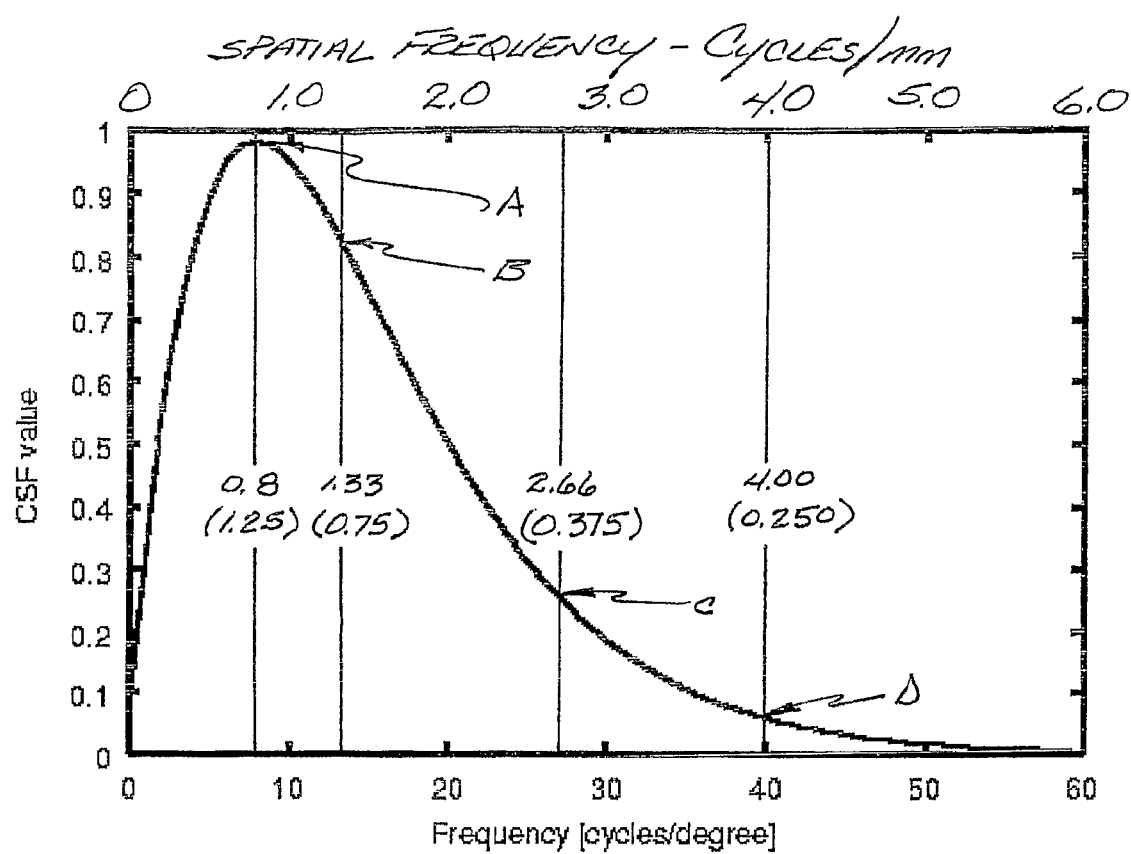
FIG. 11 is a graphical representation of the frequency response of the human visual system.

The visibility of the resulting banding artifact depends on the magnitude of the scan line spacing error (whether due to differential scan bow or an error in the process-direction separation of the lines) and the spatial frequency at which the error repeats down the page. FIG. 11 shows the contrast sensitivity function (CSF) for the human visual system and represents the eye's sensitivity to banding artifacts as a function of the spatial frequency of those artifacts. Referring to FIG. 11, the sensitivity of the human visual system to banding artifacts in printed output reaches a maximum at a particular spatial frequency and declines as the spatial frequency of the artifacts departs from this particular spatial frequency. For many printers of current interest, the spatial frequency of the banding artifact caused by the periodicity of the swath of printed scan lines is higher than the spatial frequency associated with the peak human visual response.

According to an embodiment of the invention, the visibility of banding artifacts are suppressed by further increasing the apparent spatial frequency of the artifacts. Using one technique, small errors in scan line spacing are introduced at one or more locations within a swath 54 of scan lines, thereby creating small controlled banding artifacts within each swath 54. These intentional (synthetic) artifacts, when viewed together with the unwanted artifacts at the seams between adjacent (neighboring) swaths, act to increase the spatial frequency of the overall banding pattern, moving it further from the spatial frequency of maximum visual sensitivity and making it significantly less visible. Hence, the visibility of banding artifacts caused by errors in scan line spacing at the boundaries between printed swaths (primary artifacts) in a multi-beam printer can be significantly reduced by introducing one or more visually similar artifacts within the printed swath itself (secondary artifacts). The effect of these secondary, intentional, artifacts is to, for example, double (with one secondary artifact per swath) or triple (with two secondary artifacts per swath) the effective spatial frequency of the primary artifact. By increasing the effective spatial frequency of the primary artifact in this manner, the visibility of the primary artifact can be significantly reduced.

At a standardized viewing distance of 57 cm (a comfortable distance for viewing 12×18 inch (305×457 mm) prints, a distance of 10 millimeters on a print subtends a viewing angle of 1.0 degree, allowing the horizontal axis of FIG. 11 to be re-scaled in millimeters, as indicated at the top of the graph. As shown in the FIG. 11, human visual sensitivity to a repetitive artifact is strongly dependent on the spatial frequency of that artifact and has a maximum at about 0.8 cycles/mm for this viewing distance, as indicated by point "A" in the Figure. The corresponding artifact has a pitch of 1.25 mm, the reciprocal of its spatial frequency. As an example a 12-beam digital press (printer) having a swath width of 0.375 mm may generate a primary artifact at the swath boundary at a spatial frequency of 2.66 cycles/mm (as indicated by point "C" in FIG. 11). The CSF value at this frequency is about 0.25, well below the peak value and low enough to enable acceptable print quality. If the swath width is increased to 0.75 mm, however, as would be desirable in a future 24-beam press, the CSF value increases to more than 0.8 (as indicated by point B in FIG. 11), and the visibility of the artifact is increased more than three-fold. This large increase in artifact visibility represents a significant obstacle to increasing the number of scan lines per swath (and therefore as a barrier to increasing printing speeds) in next-generation digital press products.

FIG. 11 illustrates the effect of introducing secondary artifacts within a swath of scan lines to increase the effective spatial frequency of the artifact and reduce its visibility. Adding a single secondary artifact at the center of a 24-beam/scan line swath moves the operating point from B to C in the graph, while adding two equally spaced secondary artifacts would move the operating point to D for a greater reduction in the CSF value and visibility. Further secondary artifacts could be introduced to reduce the CSF value and the visibility of the banding artifacts still further, however the number of secondary artifacts is limited by the number of scan lines in a swath.

Figure 12:
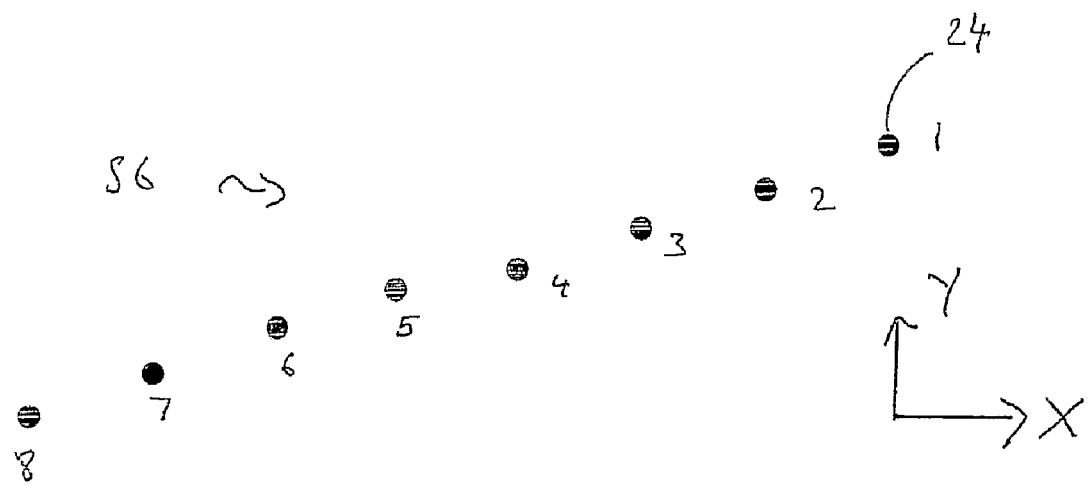
FIG. 12 schematically illustrates an array of light sources according to an embodiment of the invention.
Figure 13:
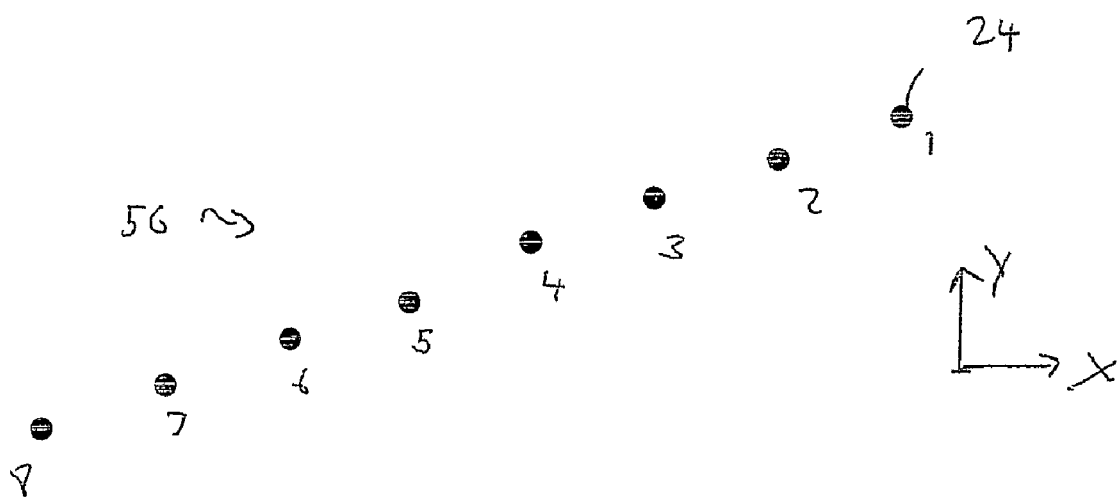
FIG. 13 schematically illustrates an array of light sources according to a further embodiment of the invention.

In one embodiment of the invention, a small position error or "static offset" is introduced in the position of selected light sources, or groups of light sources, within a multi-element light source array. This static offset causes an intentional scan line spacing error which produces a print artifact within a swath of scan lines. A static offset near the center of the laser array, for example, will introduce a banding artifact in the printed swath that is halfway between the unwanted artifacts that invariably occur between the edges of adjacent swaths, thereby doubling the effective spatial frequency of the overall banding pattern and making it less visible to the human eye. FIG. 12 illustrates an array 24 of eight light sources 24 (labeled "1" to "8") in which the spacing in the cross-scan direction Y between the light sources halfway in the array 24 (light sources labeled "4" and "5") is less than the spacing between the other light sources. Such an array can be used to produce a dark artificial banding artifact in the middle of a swath. In contrast, the array illustrated in FIG. 13 is arranged so that the light sources midway in the array 24 have a greater cross-scan spacing than the spacing between the other light sources in the array so as to produce a light artificial banding artifact in the middle of a swath.

The methods for creating secondary artifacts described above selectively introduce scan line spacing "errors" within a swath of scan lines. Another method for introducing a secondary artifact comprises introducing an offset in the light source power used to expose a selected scan line. This power offset enables one or more scan lines within a swath of scan lines to be controllably underexposed or overexposed. Such underexposure or overexposure results in a printed scan line which is visually lighter (i.e., narrower) or visually darker (i.e., wider) than its neighbors, thereby creating an intentional or secondary artifact which acts in conjunction with a primary artifact to reduce the visibility of that primary artifact as previously described.

The power of the light sources can be controlled so that secondary artifacts of either sign can be created. In general, the secondary artifacts are chosen to have the same visual polarity as the primary artifacts. Thus, a dark secondary artifact is needed to correct a dark primary artifact, and a light secondary artifact is needed to correct a light primary artifact.

The amplitude and sign of secondary artifacts produced by light source power offsets are continuously adjustable under user or machine control and can be continuously varied as a function of format position. This capability is especially useful for correcting banding artifacts due to differential scan bow, which vary as a function of format position.

Multiple alternative spatial frequency choices for banding artifacts are available to the user. For certain job types, or when using certain half-tone screens, for example, a user may prefer to triple rather than double the spatial frequency of a primary artifact. The introduction of secondary artifacts can be disabled by the operator if desired.

The use of optical power control of the light sources can be implemented with standard, unmodified laser array with uniform laser element spacing. Alternatively, in some embodiments, optical power control can be used in conjunction with a modified laser array.

In a preferred embodiment of the invention, the primary artifact (i.e., the artifact to be corrected) is biased away from its "ideal" zero-error condition. This bias causes the primary artifact to always have the same sign (i.e. the same polarity), despite the presence of unavoidable variations in the printing process due to, for example, small changes in the synchronization of the polygon scanner rotation to the photo-conductor motion. That is, the bias to be applied can be chosen so that the primary artifact will always be a dark artifact or so that the primary artifact will always be a light artifact. The width of a swath of scan lines can be adjusted during printer manufacture to be slightly wider than the nominal design width, for example, causing a dark artifact at the boundary between scanned swaths. The perceived darkness of this artifact may vary somewhat as printing conditions change, but it will always be dark. Similarly, a printer's swath width can be adjusted to create a light artifact at the boundary between print swaths that will remain light over the full range of printing conditions. By establishing the sign (i.e. the polarity) of the primary artifact (light or dark) in this manner, the laser power offset can be selected to create a secondary artifact having the same sign. The primary and secondary artifacts will then retain the same sign over the full range of printing conditions. This embodiment avoids the possibility of sign reversals in the primary artifact that could otherwise increase artifact visibility rather than reducing it. Printing experiments have verified that primary artifacts resulting from synchronization errors and other causes are more effectively and robustly suppressed by the introduction of secondary artifacts if the primary artifact is biased and thereby prevented from changing signs.

An additional method for reducing the visibility of banding artifacts caused by correcting differential scan bow is to overlap adjacent print swaths 54, thereby double-exposing a scan line 52 at a swath boundary with a last beam in a first swath and a first beam in a second swath.

FIG. 14 illustrates two neighboring print swaths, each swath being generated using an array of twelve light sources to produce twelve beams that expose twelve scan lines. The variation in separation between line 1 of a second swath and line 12 of a first swath is illustrated by bars in FIG. 14. Bars labeled 101 and 103 show the small variation in separation between neighboring scan lines 11 and 12 of swath 1. Bars labeled 102 and 104 show the much larger variation in separation between scan line 12 of swath 1 and scan line 1 of swath 2.

Figure 15:
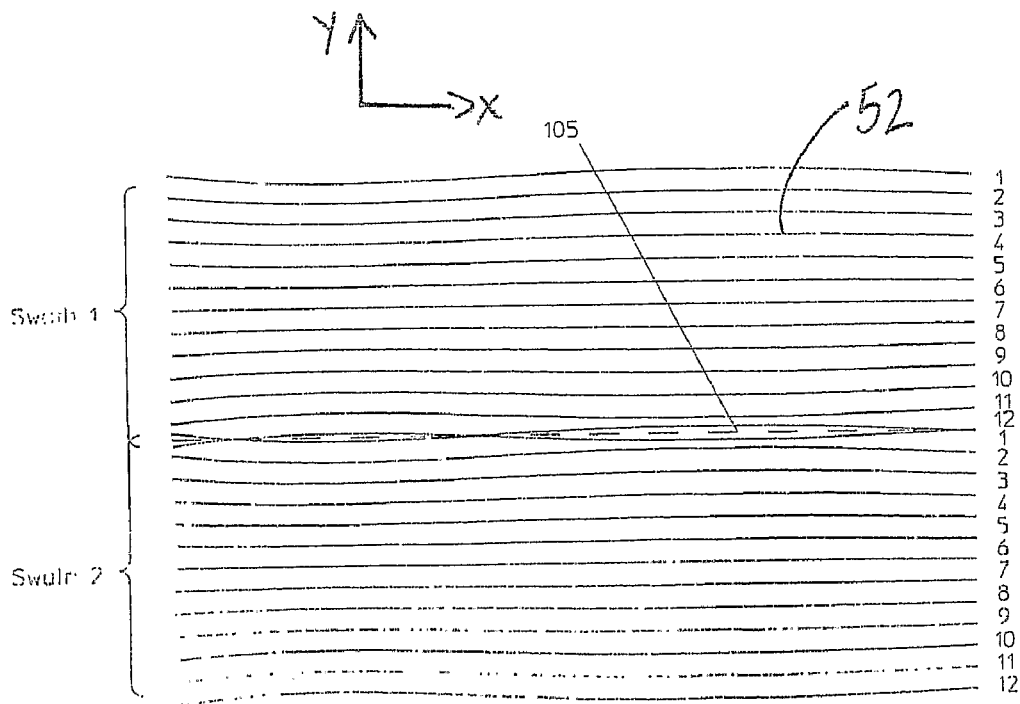
FIG. 15 schematically illustrates two neighboring swaths of scan lines which have been overlapped to form a composite scan line according to an embodiment of the invention.

Referring to FIG. 15, according to an embodiment of the invention, the average cross-scan separation between scan line 12 of a first swath and scan line 1 of a second swath is set to zero, causing them to overlap and to create a single composite scan line 105. The nominal optical power applied to the photoconductor during each of the overlapping exposures is set to ½ of the laser power used to expose other scan lines (e.g., scan lines 2-11) and similar digital image data is used to modulate the light sources that generate scan lines 1 and 12 during the two overlapping exposures. Because differential scan bow is symmetric about the center of the swath (i.e., about a line midway between scan lines 6 and 7 in our example), the curvature of scan line 12 will be a mirror image of the curvature of scan line 1. The actual center of the exposed composite scan line will coincide with the geometric centerline of the two overlapping component scan lines and the composite scan line will contain no differential scan bow. FIG. 15 shows the formation of composite scan line 105 from overlapping scan lines 12 and 1 of swaths 1 and 2, respectively. The overlap can be created by adjusting the separation distance between swaths 1 and 2 by changing the relationship between the polygon rotation speed and the speed of the photoconductor, or by adjusting the width of swaths 1 and 2, or by a combination of these methods.

Figure 16:
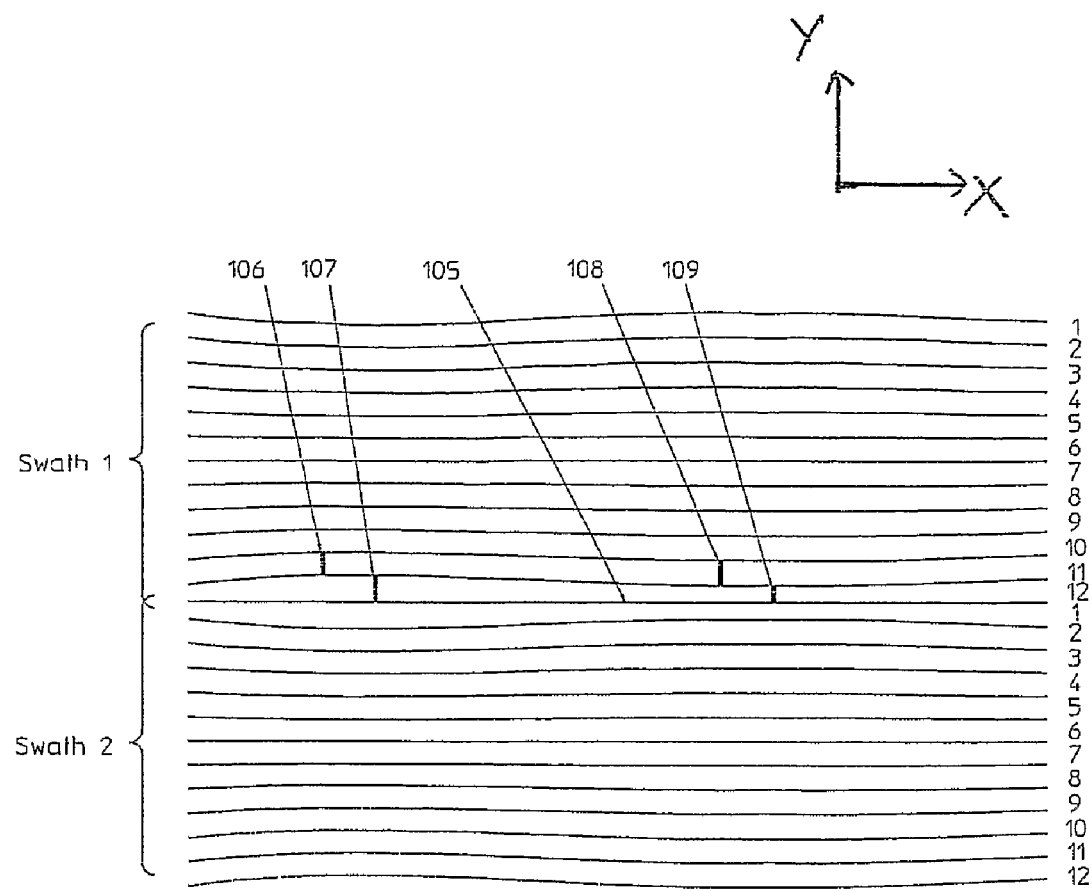
FIG. 16 schematically illustrates a composite scan line formed by overlapping two neighboring swaths of scan lines according to an embodiment of the invention.

FIG. 16 shows the fully formed composite scan line 105 and the accompanying approximate 50% reduction in scan line spacing error at the swath boundary. Bars 106 and 108 show the relatively small spacing difference between neighboring scan lines 10 and 11 of swath 1, while bars 107 and 109 show the much reduced variation in separation between scan line 11 of swath 1 and composite scan line 105 formed from component scan lines 12 and 1. The residual error is about one-half as large as the uncorrected scan line spacing error shown in FIG. 10 and is equally distributed on both sides of the composite scan line.

The above-described method for reducing the visibility of print artifacts due to differential scan bow is equally suitable for reducing the visibility of artifacts at swath boundaries caused by scan line spacing errors. Such errors result in an anomalously wide or narrow scan line separation distance at swath boundaries that is similar to the error caused by differential scan bow, except that it is constant across the format.

If differential scan bow is present, and the nominal laser power used to expose each of the overlapping scan lines that form a composite scan line 105 is held constant, the perceived density of the composite scan line will generally vary as a function of format position. This variation occurs because the separation between the centers of the overlapping scan lines (scan line 1 and 12) that form the composite scan line 105 changes with format position X. Under these conditions, the size of developed and printed dots in the composite scan line 105 is a sensitive and non-linear function of the distance between the centers of the exposing beams. In general there will also be a format-independent spacing error between overlapping beams 1 and 12 due to limitations in the accuracy with which swath width can be adjusted during printer manufacture. Both of these errors are repeatable from swath to swath and can be compensated together by creating a format-position dependant laser power function for exposing the overlapping scan lines. The dot size of the resulting composite scan line will thereby be controlled so that the visually perceived density of the composite scan line matches that of its neighbors along its length and, when compared to neighboring scan lines, will contain only the common mode scan bow that is present in all scan lines.

Although described here by means of an example that overlaps two scan lines at a swath boundary to form one composite scan line, more than one composite scan line can be created at a swath boundary by overlapping two or more pairs of scan lines. In general, overlapping additional scan lines will further reduce the visibility of scan line spacing artifacts at a swath boundary.

Although the creation of a format-position dependant laser power function is described above as a means for correcting residual errors in a printer which corrects differential scan bow by creating a composite scan line, such a format-dependent laser power function can be used more generally to minimize the visibility of uncorrected ie uncorrected after $1^{st}$ design correction differential scan bow or residual scan bow remaining after other correction methods have been used. The primary visual effect of differential scan bow is the apparent variation in scan line density at swath boundaries as a function of format position. This perceived variation in density is caused by actual differences in printed dot size due to "dot gain" (wherein developed dot size depends on the distance between neighboring dots) as well as by the increased or decreased spatial density of dots due to the variation in scan line spacing along the format. In both cases, the change in perceived density along a scan line can be substantially compensated by a format-dependent laser power correction. Such a power correction function could be implemented in numerous ways, including a lookup table determined at the time of printer assembly and testing and written into a printer memory. The power correction function could also be implemented in the field by, for example, a service engineer or other user.

The visibility of residual artifacts at swath boundaries due to uncorrected differential scan bow can be further reduced by combining the methods described above with the above-described methods for doubling the effective spatial frequency of an artifact at a swath boundary by introducing a small laser power offset to create a secondary artifact near the center of the swath. The composite scan line at the swath boundary and the central scan line of the swath will, to a very good approximation, contain only common mode scan bow and will have a nearly constant separation. By introducing a small laser power offset when exposing these scan lines, the effective spatial frequency of the artifact is doubled and moved to a region of the visual contrast sensitivity function where residual inaccuracies at the interface between swaths will be effectively hidden.

Embodiments of the methods described in this disclosure apply to scanned laser displays as well as to laser printers.

Although these methods have been described and illustrated for an example printing system having 12-scan lines per swath it will be obvious that they apply to printers and displays having other numbers of scan lines per swath.

The benefits of embodiments of the invention over prior solutions include:

1. The ability to correct scan bow artifacts, especially those caused by differential scan bow enables increasing the number of scan lines printed in each swath, thereby increasing achievable printing speed, and/or reducing the cost of scan lenses used in laser printers and digital presses.
2. The ability to implement the invention in existing printer designs with minimal changes.
3. Requirements for new data processing or signal processing are minimal.
4. The overall cost of implementing the various elements of the invention is expected to be minimal.
5. No new print artifacts are expected.
6. The invention is expected to offer significant increases in print quality.

Although the elements/embodiments of the invention have been described separately, a printer constructed according to an embodiment of the invention would generally incorporate multiple elements of the invention in the same system. For example, a laser printer might overlap the first and last scan lines of adjacent swaths to reduce the visibility of scan bow artifacts while also introducing secondary artifacts to increase the effective spatial frequency of any residual error. Similarly, any of the elements/embodiments of the invention described herein may be combined with other elements/embodiments of the invention to create a printing system having a desired combination of attributes.

Embodiments of the invention have applicability to copiers, fax machines, digital printing presses, plate setters for offset printing, direct-to-film laser scanners, scanned laser displays and other printing and display devices.

Although embodiments of the invention have utility for printing, the inventors have used their foresight to realize that other embodiments of the invention have utility in other fields of technology in which light is scanned across a medium. Such a field of technology is the fabrication of electrical circuits. Some systems used for the fabrication of electrical circuits or semiconductor devices scan light onto a photoresistant coated substrate to produce an exposed scan line on the substrate and then process the substrate by means of a chemical reaction, etching or deposition process (e.g., photolithographic processes). A minimum exposure energy density may be required for the light on the substrate in order that a circuit can be properly manufactured.

Artifacts, such as scan bow, that have been discussed in relation to printers, may also occur when producing scan lines on a substrate for an electrical circuit and such artifacts can be corrected in the same or a similar way. That is, the scan line geometry may be controlled by controlling the optical power produced by the plurality of light sources that can be used to produce a scan line on the substrate and/or the separation of the light sources. The control may be exercised in the same, or a similar, way to that which has hereinabove been described in relation to printers.

Making printed circuits or some kinds of semiconductor structures (e.g., photolithographically) can be considered a form of printing.

Another field of technology wherein embodiments of the invention have utility is the field of displays in which light is scanned across a medium, typically a reflective, transmissive or phosphorescent display screen, to display information and images using raster scanned beams of light. In much the same way as previously described for laser printers, such displays often scan light spots across a display screen to form scan lines that produce a displayed image. In an embodiment of the invention light from a 2D array of light sources is arranged to scan a reflective or transmissive viewing screen in the X and Y directions, thereby forming a raster image for displaying information.

The invention claimed is:

1. A method of reducing the visibility of primary artifacts associated with a swath of scan lines produced by an array of light sources, the method comprising producing swaths of adjacent scan lines and causing the light sources to produce at least one synthetic secondary banding artifact in each swath of adjacent scan lines so that the combined spatial frequency of primary banding artifacts and synthetic secondary banding artifacts associated with the swath is greater than the spatial frequency of the primary banding artifacts associated with the swath, such that the visibility of the primary artifacts is reduced.

2. The method of claim 1, wherein the combined spatial frequency is substantially double or triple the spatial frequency of the primary banding artifacts associated with the swath.

3. The method of claim 1, wherein the combined spatial frequency is equal to or greater than 2.0 cycles per millimeter.

4. The method of claim 1, comprising causing the light sources to produce synthetic secondary banding artifacts that have the same polarity as the primary banding artifacts, the polarity determining whether an artifact is a visually dark artifact or a visually light artifact.

5. The method of claim 1, comprising causing the light sources to produce primary banding artifacts of a particular polarity and synthetic artifacts of the same particular polarity.

6. The method of claim 1, wherein the synthetic secondary banding artifact is produced by having a separation in the cross-scan direction between respective light sources in the array for producing respective scan lines that is different from the separation in the cross-scan direction between other light sources for producing other respective scan lines in the swath.

7. The method of claim 1, wherein the synthetic secondary banding artifact is produced by controlling the intensity of light spots produced by the array of light sources so that either dark or light synthetic secondary artifacts are produced.

8. The method of claim 1, wherein the array of light sources produces a swath of lines on a photosensitive medium as part of a printing process.

9. The method of claim 1 comprising controlling the power of the light sources used to produce the scan lines as a function of position in the scan direction.

10. A printer comprising:
an array of lasers;
an optical means to receive light from the lasers and form an array of light spots on a photosensitive surface;
a polygon mirror arranged to scan the array of light spots across the photosensitive surface to generate a swath of adjacent scan lines on the photosensitive surface, the swath having associated primary banding artifacts; and
a controller to control the optical power of light produced by the lasers;
wherein the controller is arranged to control the lasers to produce at least one synthetic banding artifact in each swath of adjacent scan lines, the synthetic banding artifacts being arranged so that the combined spatial frequency of the primary banding artifacts and of the synthetic banding artifacts associated with the swath is greater than the spatial frequency of the primary banding artifacts, such that visibility of the primary banding artifacts is reduced.

11. The printer of claim 10, wherein the synthetic artifacts are positioned to reduce the visibility of the primary banding artifacts.

12. The printer of claim 10, wherein the visual polarity of the synthetic artifacts is selected to reduce the visibility of the primary banding artifacts.

* * * * *